March 31, 1925.
W. E. HALE
1,531,860
SKIP HOIST CONTROL
Filed March 6, 1923
2 Sheets-Sheet 1
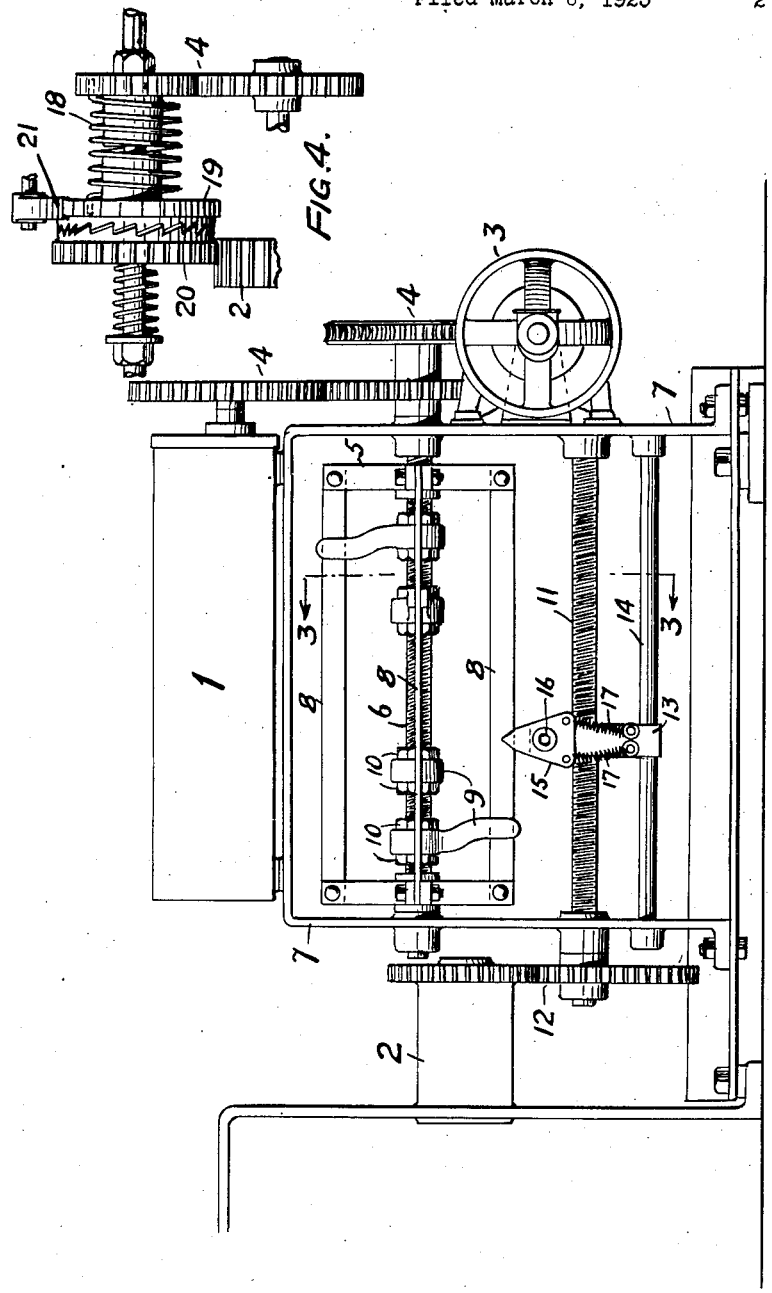
INVENTOR
William E. Hale
BY
Augustus B. Stoughton
ATTORNEY.
WITNESS:

March 31, 1925.

W. E. HALE

SKIP HOIST CONTROL

Filed March 6, 1923  2 Sheets-Sheet 2

1,531,860

WITNESS:

INVENTOR
William E. Hale
BY
Augustus B. Stoughton
ATTORNEY.

Patented Mar. 31, 1925.

1,531,860

UNITED STATES PATENT OFFICE.

WILLIAM E. HALE, OF FORT WASHINGTON, PENNSYLVANIA, ASSIGNOR TO R. H. BEAUMONT COMPANY, OF PHILADELPHIA, PENNSYLVANIA, A CORPORATION OF PENNSYLVANIA.

SKIP-HOIST CONTROL.

Application filed March 6, 1923. Serial No. 623,082.

*To all whom it may concern:*

Be it known that I, WILLIAM E. HALE, a citizen of the United States, residing at Fort Washington, in the county of Montgomery and State of Pennsylvania, have invented a new and useful Improvement in Skip-Hoist Controls, of which the following is a specification.

Two speed double wound alternating current motors are frequently employed for operating skip hoists usually with two speeds forward and two speeds reverse and the connections for the controllers of such motors are complicated.

It is the principal object of the present invention to provide for the automatic power actuation of such a controller and further to provide for adjustment or timing of the speed changes.

To this and other ends hereinafter stated the invention may be said to be embodied in the combination of a skip hoist and its controller, a motor device tending to operate the controller, a revoluble squirrel cage geared to the motor device, a screw-and-nut responsive to the movement of the skip hoist, and a detent carried by the nut and co-operating with the bars of the squirrel cage and operated thereby to release the squirrel cage and motor device and operate the controller with a step by step motion.

The invention further comprises the improvements to be presently described and finally claimed.

In the following description reference will be made to the accompanying drawings forming part hereof and in which—

Figure 1 is an elevational view of skip hoist control embodying features of the invention showing also parts or elements of a skip hoist.

Fig. 4 is an elevational view illustrating a modification.

Figure 3:
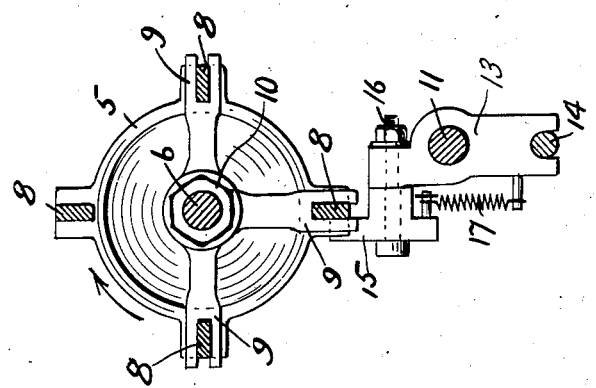
Fig. 3 is a sectional view taken on the line 3—3 of Fig. 1.
Figure 2:
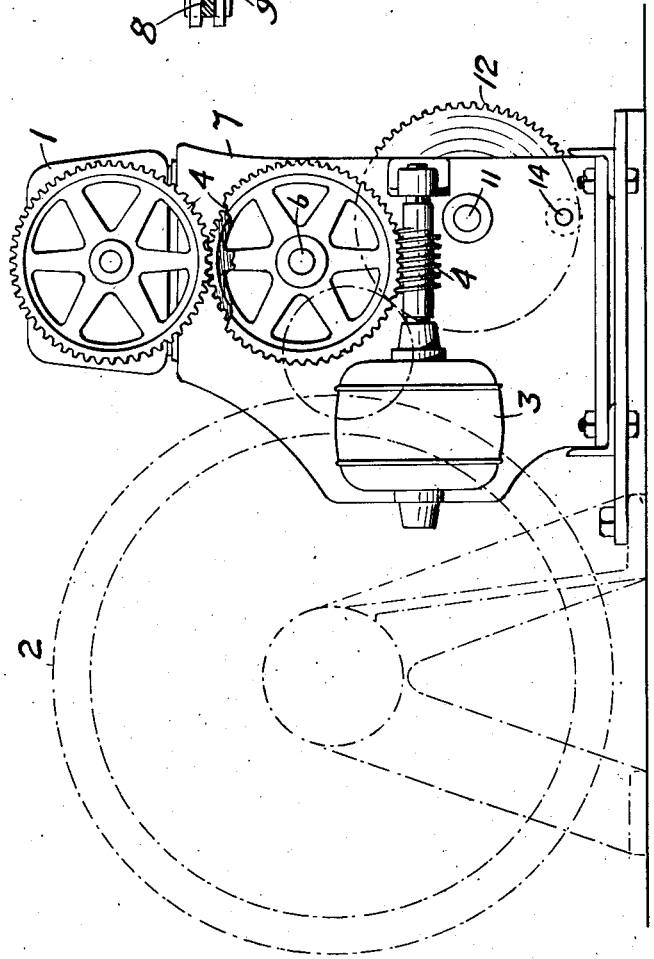
Fig. 2 is a side view of the same with parts broken away.

In the drawings 1, generally, indicates the controller of the motor that actuates the skip hoist, portions of which are indicated generally at 2. The controller is effective for providing two speeds forward and two speeds reverse. These are usual provisions of a skip hoist and are too well understood by those skilled in the art to require further illustration or description. Referring more particularly to Figs. 1, 2 and 3, 3 is a torque motor for operating the controller 1 to which it is geared by gearing 4. 5 is a squirrel cage connected for rotation with the gearing 4 and mounted on a shaft 6 turnable in a frame 7. The squirrel cage is shown as provided with four bars 8, because in the present instance the controller 1 is to be set for two speeds forward and two speeds reverse. Each bar of the squirrel cage is provided with a tappet 9. The tappets 9 are adjustable along the shaft 6, shown as screw threaded, by means of nuts 10. 11 is a screw which is turned in synchronism with the skip hoist and as shown it is connected with the part 2 of the skip hoist by gearing 12. This screw 11 is turnably mounted in the frame 7 and is provided with a nut 13 held against rotation by the guide 14 but adapted to travel back and forth on the screw 11 when the latter is turned in one direction or the other. 15 is a detent pivoted to the nut at 16 and normally positioned to extend from the screw 11 by springs 17.

From right to left in Fig. 1 the tappets 9 respectively determine high speed reverse, low speed forward, low speed reverse, and high speed forward.

The mode of operation may be described as follows: As the screw 11 is turned in one direction or the other by the movement of the skip hoist, or more accurately the part 2 hereof, the detent 15 slides along one of the bars of the squirrel cage and holds it and the torque motor and the controller 1 at rest. The tappet arms 9 are so set that in the appropriate part of the cycle the detent 15 colliding with one of them is turned against the tension of its spring 17 out of the path of the squirrel cage 8 which it has been detaining, thereby releasing the squirrel cage and the torque motor 3 which runs, shifting the controller 1, until the detent 15 is returned by its springs to its projected position in which it catches the next bar of the squirrel cage, stopping the torque motor. A repetition of the described operation positions and sets the parts for a repetition of the described cycle of operation of the skip hoist.

The squirrel cage and detent and their accessories are of course one form of step by step escapement mechanism.

A torque motor is one form of motor device which while tending to move and drive the controller can be restrained and held at rest, as by the squirrel cage and which can be released with a step by step motion, but it is not the only form of motor device that can be employed in the practice of this invention.

The construction and mode of operation shown in Fig. 4 are as above described except as follows: 18 is a spring of which one end is connected with the gearing 4 and of which the other end is connected to one element 19 of a ratchet clutch of which the other element 20 is connected with the gearing 2, and there is a detent 21 for the element 19, so that the gearing 2 winds the spring which, when released, operates the gearing 4. In this case a spring motor replaces the torque motor.

Obviously departures may be made in mere matters of form of embodiment without departing from the invention which is not limited as to such matters or otherwise as the prior art and the appended claims may require.

I claim:

1. Skip hoist control comprising the combination of a skip hoist and its controller, a motor device for operating the controller, a revoluble squirrel cage geared to the motor device, a screw and nut responsive to the movement of the skip hoist, and a normally projected detent carried by the nut and co-operating with the bars of the squirrel cage and operated thereby to release the squirrel cage with a step by step motion.

2. Skip hoist control comprising the combination of a skip hoist and its controller, means for operating the controller, a revoluble squirrel cage geared to said means, tappets on the arms of the squirrel cage, a screw and nut responsive to the movement of the skip hoist, and a normally projected detent carried by the nut and co-operating with the bars and tappets of the squirrel cage.

3. Skip hoist control comprising in combination a skip hoist and its controller, a motor device for operating the controller, and a step by step escapement mechanism geared to the motor device and released by the movement of the skip hoist.

WILLIAM E. HALE.